United States Patent Office 2,807,771
Patented Sept. 24, 1957

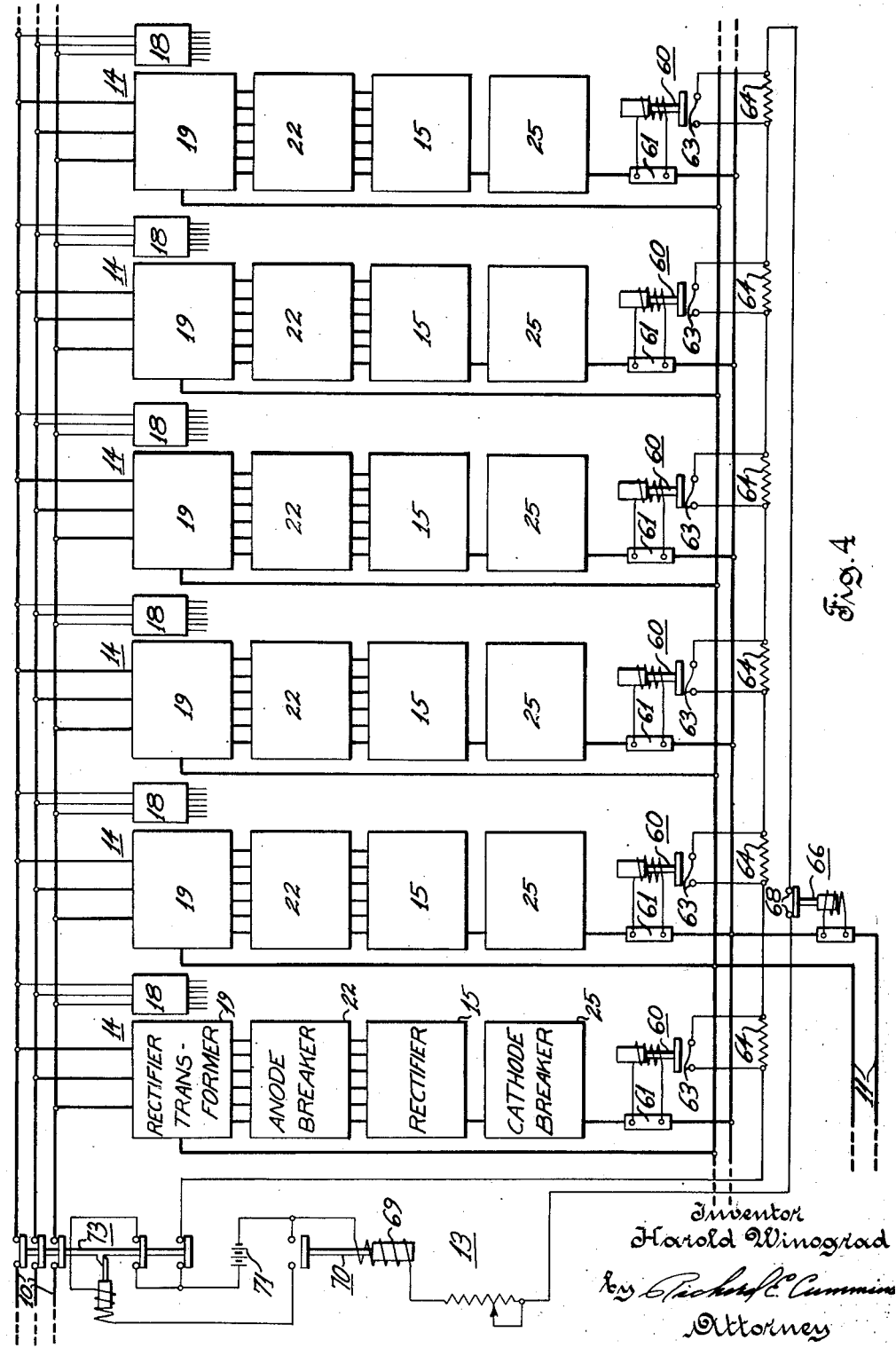

2,807,771

RECTIFIER DISCONNECTING SYSTEM RESPONSIVE TO INOPERATIVENESS OF SEVERAL UNITS

Harold Winograd, Milwaukee, Wis., assignor to Allis-Chalmers Manufacturing Company, Milwaukee, Wis.

Application December 28, 1954, Serial No. 478,046

7 Claims. (Cl. 321—14)

This invention relates in general to electric current translating systems having a plurality of translating units connected in parallel between a supply circuit and a load circuit and in particular to an improved protective system which operates to disconnect all of the units from the supply circuit in response to conditions in a predetermined number of individual units.

For some applications of direct current power, such as applied to aluminum reduction potlines, or the magnetic circuit of high power particle accelerators, the power requirement of a single load circuit is so high that it is supplied by a number of parallel operating translating units, such as mercury arc rectifiers. The load circuit in such applications usually has an appreciable amount of inductance, and the energy stored in some of these circuits is so high that the load circuit cannot be interrupted successfully by any available circuit breaker. It is also undesirable to interrupt the load circuit because of the resulting high voltage surge. In order to remove the power from the load circuit it is usually necessary to disconnect the conversion units from the supply circuit which allows the direct current to flow through the load circuit and the translating units for a short time until the stored energy of the load circuit is dissipated by the losses in the circuit resistances.

In such systems the individual units are most usually provided with individual protective device which isolate each unit from the rest of the system. For example, conversion systems comprising a plurality of electrical valve conversion units are usually provided with protective devices which disconnect a unit if an arc-back occurs in the unit, or which disconnects the unit when it becomes overloaded. It could happen that arc-backs could occur in several units in succession. The remaining units would become overloaded and their load protective devices would also trip out in succession. The last device to operate would open the load circuit. Since the device is incapable of interrupting the circuit having high stored energy, the arc on the device would be maintained and would very likely destroy the device and cause other serious damage.

According to the present invention, a protective system is provided to protect the translating units in such a circumstance. The present protective system provides that all of the translating units of the system will be disconnected from the supply circuit when a predetermined number of units have been rendered inoperative.

It is therefore an object of the present invention to provide in a translating system comprising a plurality of individual translating units, a protective system which disconnects all of the units from the supply source in response to conditions in each of a predetermined number of said plurality of units.

Another object of the present invention is to provide in a current conversion system having a plurality of electric valve conversion units operating in parallel between a supply circuit and a load circuit, an improved protective system which causes all of the units to be disconnected from the supply circuit when a predetermined number of units become overloaded and are rendered inoperative in response to the overload condition.

Objects and advantages other than those mentioned above will be apparent from the following description when read in connection with the drawings in which:

Fig. 4 illustrates another modification of the system shown in Fig. 1.

Figure 1:
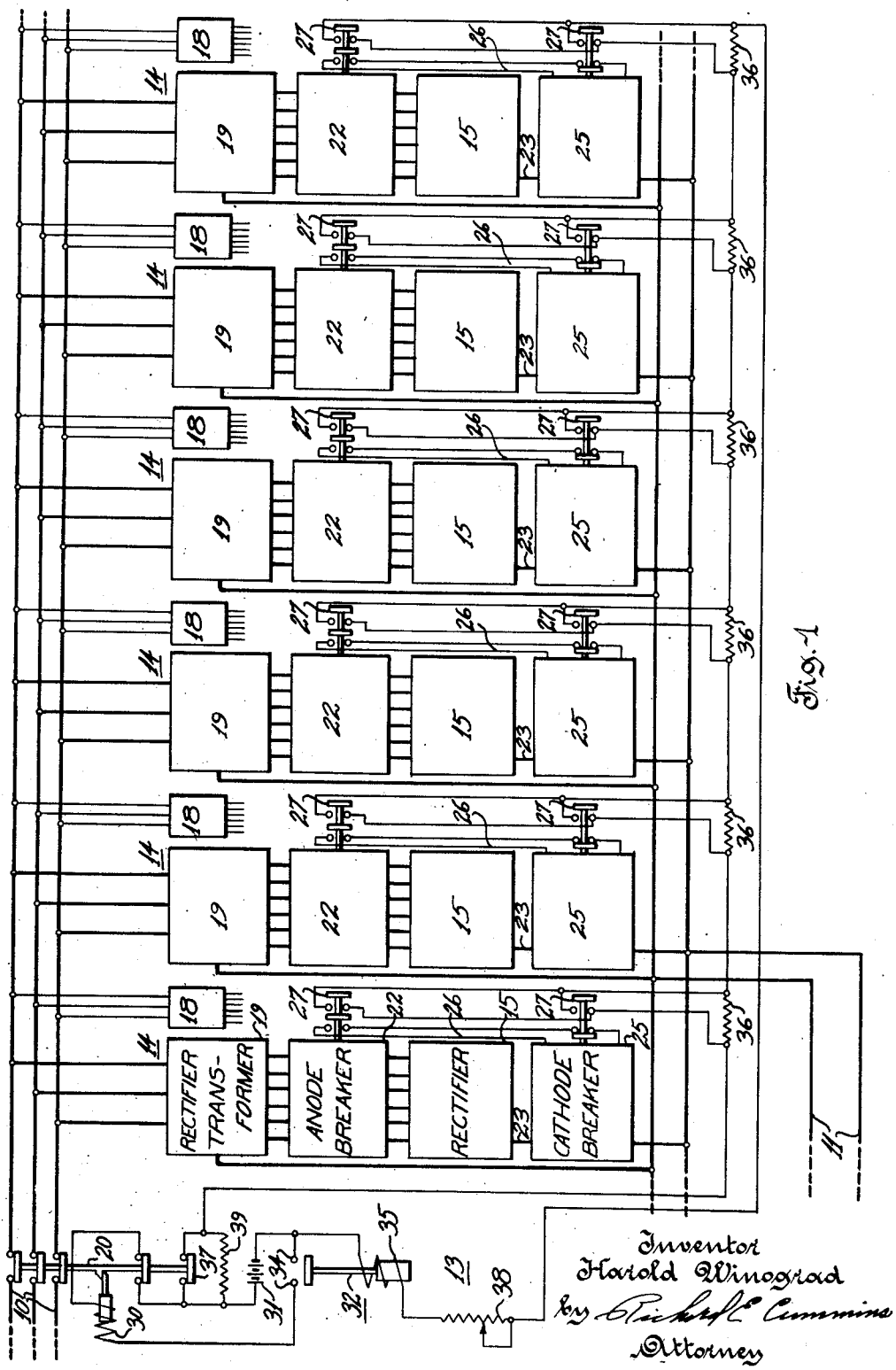
Fig. 1 is a schematic drawing of the improved protective system embodied in a translating system comprising a plurality of electric valve conversion units.

Referring to Fig. 1 there is illustrated generally a system for translating power from a supply circuit 10 to a load circuit 11 by means of a plurality of individual translating units connected in parallel between the circuits 10, 11 and a protective system 13 which is operable to disconnect all of the units from the supply circuit 10 in response to the inoperation of a predetermined number of individual units.

As shown in Fig. 1, the translating system comprises a plurality of current conversion units 14 of the electric valve type connected in parallel between the supply circuit 10 and the load circuit 11.

Figure 2:
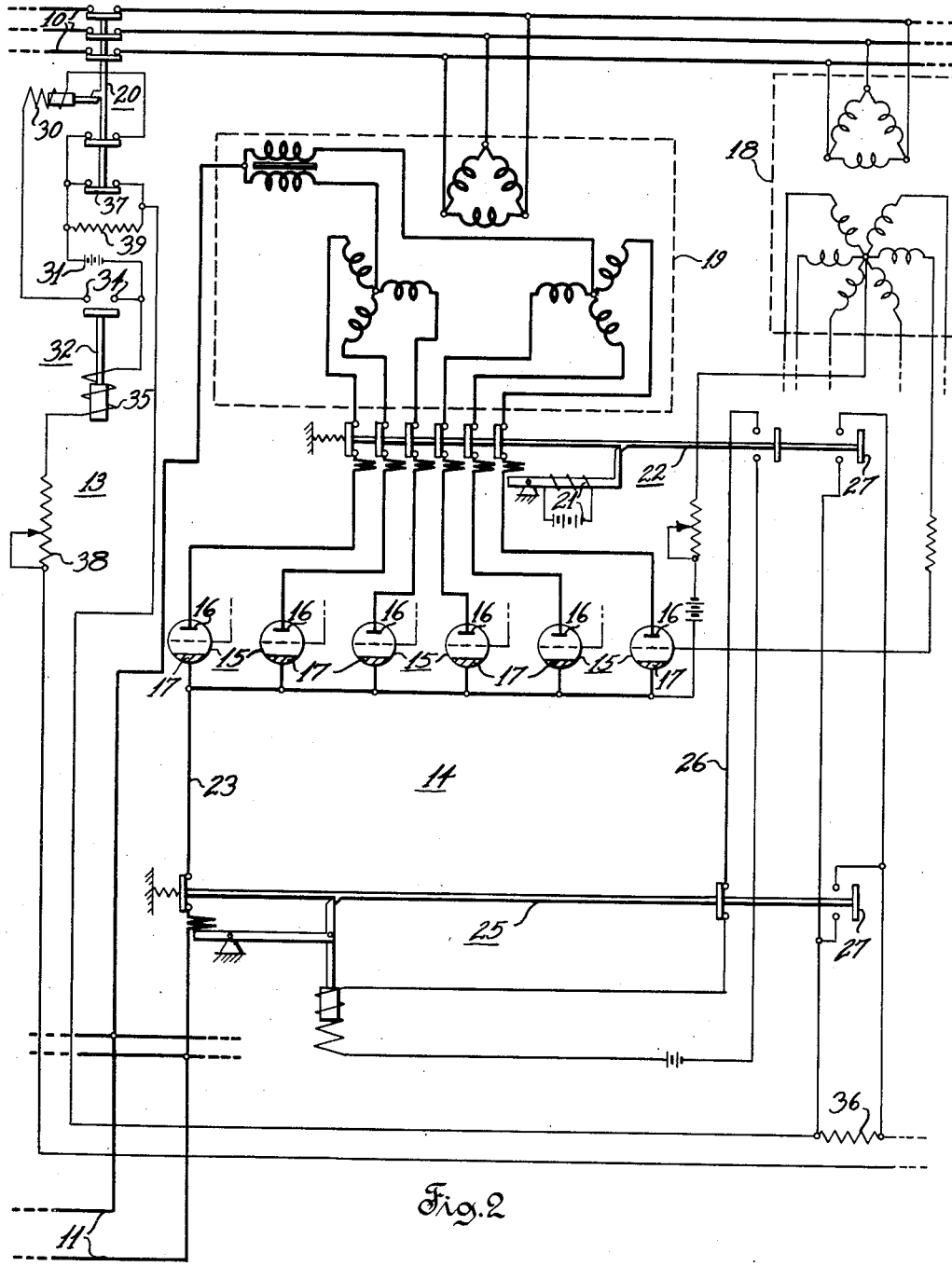
Fig. 2 is a drawing illustrating schematically one of the conversion units shown diagrammatically in Fig. 1.

All the conversion units 14 are similar, so only one is described in detail. Referring to Fig. 2, the conversion unit shown therein comprises a plurality of electric valves 15 of the mercury arc type each provided with an anode 16, a cathode 17, and means for controlling the conduction of each valve such as a control grid and a grid transformer 18. Each valve is also provided with suitable excitation means (not shown) for starting and maintaining an arc at the cathode of the valve. The anodes 16 of the valves are connected to the supply circuit 10 through a rectifier transformer 19 and circuit interrupting means such as an A. C. circuit breaker 20. Also as shown in Figs. 1 and 2, an anode circuit breaker 22 is preferably connected between the rectifier transformer 19 and the anodes 16 of the valves 15 to protect the valves and transformer in case an arc-back occurs through the anode of any valve in the unit. When an arc-back occurs, the current flows through the valve from the cathode to the anode. This reverse flow of current causes the reverse current trip 21 of the anode breaker 22 to open the breaker, as is well known in the art.

The cathodes 17 of all the valves are connected to a direct current bus 23 which in turn is connected to the load circuit 11 through a cathode or D. C. breaker 25. The breaker 25 is operable to disconnect the unit from the load circuit 11 when that unit becomes overloaded to a predetermined extent.

As shown, an interlock circuit 26 may be provided between the cathode breaker 25 and the anode breaker 22 to trip the cathode breaker when the anode breaker has opened. Also, as shown, both the anode breaker 22 and the cathode breaker 25 are provided with auxiliary switches 27, the function of which is explained later in the specification.

Referring again to Fig. 1, the means for opening the A. C. circuit breaker 20 comprises a trip coil 30, a source of voltage, and a protective relay 32. The trip coil 30 is energized by a battery 31 or some other suitable source of voltage when contacts 34 of the protective relay 32 are closed.

Means are provided for causing the contacts 34 of relay 32 to close when a predetermined number of units are rendered inoperative. This means may comprise a series circuit including a source of voltage, the relay coil, a plurality of current limiting devices, and means associated with each unit for inserting a different one of the devices in the series circuit or means associated with each unit for short circuiting a different one of the devices out of the circuit. In other words, the contacts 34 of relay 32 may be closed by either energizing coil 35 or deenergizing coil 35 to a predetermined extent.

As shown, the coil 35 of the protective relay 32 is connected in series with the battery 31 through a plurality of current limiting devices such as resistors 36, and means associated with each unit is provided for short circuiting a different one of the resistors out of the series circuit in response to a condition of that unit. This means includes the auxiliary switches 27 of the A. C. breaker 25 and the anode breaker 22. The resistor 36 of each unit, as shown, is therefore short circuited when either or both breakers are opened in response to an overload or an arc-back on the associated unit.

When all of the units 14 are operating, the D. C. breakers 25 and the anode breakers 22 are closed. The contacts of the auxiliary switches 27 are open and all the resistors 36 are connected in series with the relay coil 35, and the battery 31. A rheostat 38 is also inserted in series with the relay coil 35. The rheostat 38 is set so that the current supplied to the relay coil 35 is sufficient to actuate contacts 34 when a predetermined number of the units 14 are rendered inoperative and their respective resistors 36 are short circuited by their auxiliary switches 27. A resistor 39 is also inserted in series with relay coil 35, but resistor 39 is bridged by an auxiliary switch 37 on the A. C. circuit breaker 20 when the breaker is closed. The purpose of resistor 39 is to permit relay 32 to drop out when the A. C. breaker 20 has opened, because the dropout current of the relay will usually be less than its pickup current.

The operation of the system shown in Fig. 1 is as follows:

Under normal operating conditions the A. C. circuit breaker 20 and the respective anode and cathode breakers of the units are closed connecting all of the units in parallel between the A. C. supply circuit 10 and the D. C. load circuit 11. The auxiliary switches 27 are open and all of the resistors 36 are in series circuit with the coil 35 of the protective relay 32, the battery 31, and the rheostat 38. Rheostat 38 is suitably adjusted so that when a predetermined number of units are rendered inoperative, and the respective resistors 36 in the protective circuit are short circuited by the contacts of the auxiliary switches 27, the protective relay 32 is operated to the closed position.

Assume that rheostat 38 is set so that when any three of the resistors 36 are short circuited by their auxiliary switches 27 the current supplied to the coil 35 of the protective relay 32 from the battery 31 is sufficient to operate the protective relay 32 to the closed position.

Under these conditions if two of the units are rendered inoperative for example, as the result of an arc-back, their anode breakers 22 open and the auxiliary switches 27 close, short circuiting the respective resistors 36 in the protective circuit. Since the units are provided with interlocks between the anode breakers 22 and the cathode breakers 25, the cathode breakers 25 also open, isolating these electric valves from the conversion system.

Assume also that at least one of the remaining four units becomes overloaded and is disconnected from the load circuit by opening of its cathode breaker 25.

The operation of the cathode breaker 25 of the third unit causes the auxiliary switch 27 of that unit to short circuit its associate resistor 36 in the protective circuit, causing the contacts 34 of the protective relay 32 to be operated to the closed position.

Closing the contacts 34 of the protective relay 32 energizes the trip coil 30 of the A. C. circuit breaker 20 causing that breaker to open and disconnect all of the units from the supply circuit 10. Even if the cathode breakers of the remaining three units should open before the A. C. breaker can open, the fast tripping of the A. C. breaker 20 reduces considerably the duty on the last cathode breaker to open and would eliminate or minimize any possible damage.

As stated previously, disconnecting all of the units from supply circuit 10 allows the current to flow through the load circuit 11 and the remaining three units for a short time until the stored energy of the load circuit is dissipated by the losses in the circuit resistances.

While only six units are shown in the system of Fig. 1, the operation of the system is not changed if more or fewer units are provided, the usual number of units for such systems being twelve.

Figure 3:
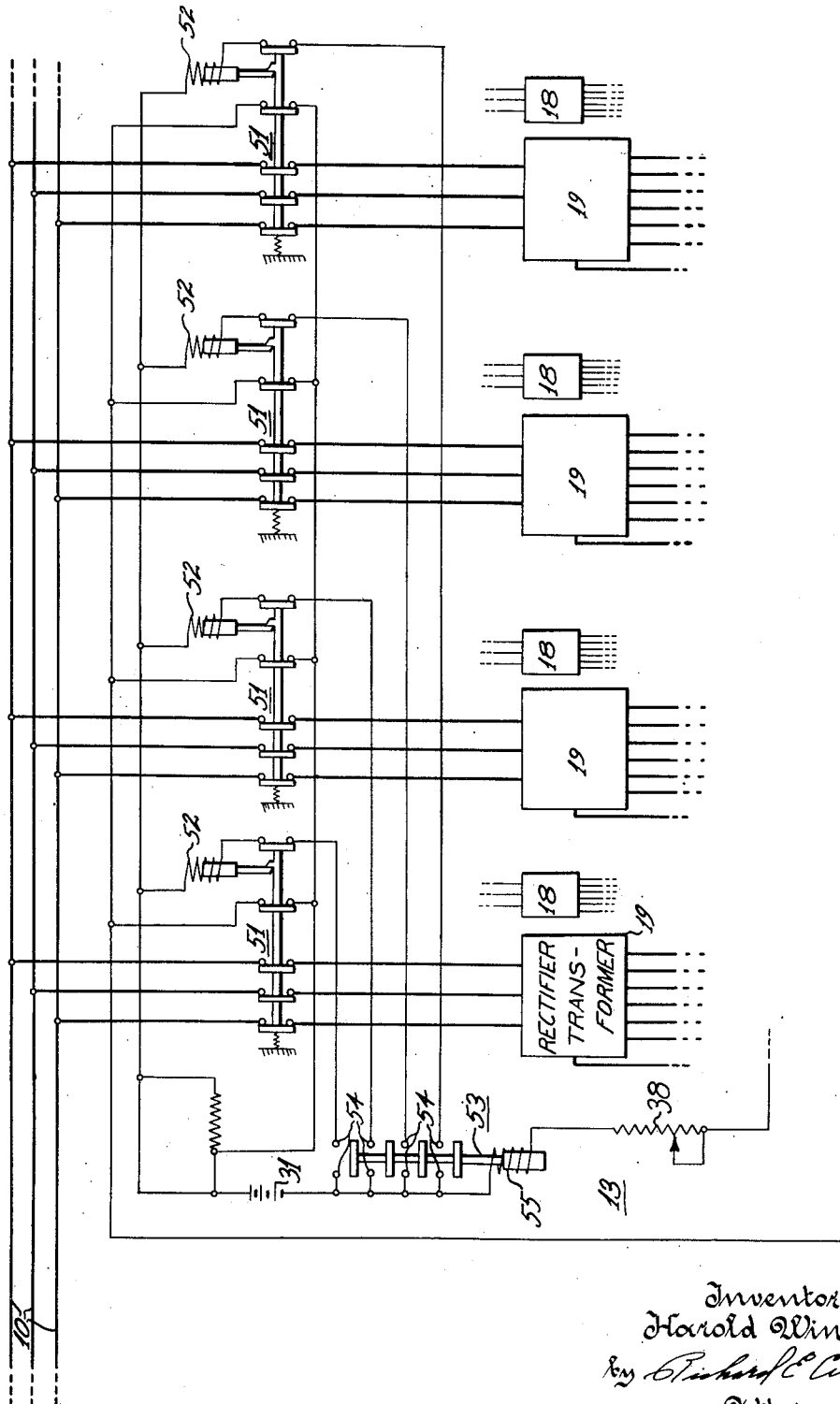
Fig. 3 illustrates diagrammatically a modification of the protective system shown in Fig. 1.

Fig. 3 shows a modification of the protective system shown in Fig. 1. This system is similar to that in Fig. 1 except that each unit is provided with an individual A. C. circuit breaker 51. All the A. C. circuit breakers together comprise the means for disconnecting all of the units from the supply circuit. The system as shown comprises four units but the system operates the same with more or fewer units. Each A. C. circuit breaker 51 is provided with a trip coil 52 and the protective relay 53 has a number of contacts 54 corresponding to the number of units. All the contacts 54 are closed simultaneously when the coil 55 of the relay 53 is suitably energized. The operation of the system shown in Fig. 3 is substantially the same as described previously with respect to the system of Fig. 1.

Fig. 4 shows another modification of the translating system shown in Fig. 1. In Fig. 4 each unit is provided with means for short circuiting the resistor 64 in response to that unit not conducting current. This means may comprise a current relay connected to either a shunt in the D. C. circuit of the unit or a current transformer disposed on the A. C. side of the unit. As shown, a current relay 60 is connected to a shunt 61 in the D. C. circuit of the unit. The current relay 60 has contacts 63 which operate to short circuit resistor 64 in the protective circuit. The function of relays 60 is the same as the auxiliary switches 27 of the anode and cathode breakers of the units shown in Fig. 1. The contacts 63 of the current relay 60 close when substantially no current is being delivered to the load circuit 11 by that unit, that is when the unit is not conducting current. The protective system is thus responsive to any condition which renders the unit nonconducting.

In addition, the protective circuit includes a starting relay 66 responsive to the current in load circuit 11 and has a pair of contacts 68 in series circuit with all of the resistors 64, the coil 69 of the protective relay 70, and the battery 71. The contacts 68 of the starting relay 66 are closed only when there is current in the load circuit 11. The purpose of this relay is to prevent tripping of the A. C. circuit breaker 73 on starting of the system when the units are not carrying current. If desired, the starting relay 66 may be provided with a short time delay to permit the current relays 60 of the protective circuit to open their contacts after the current starts to flow. Also, if necessary, the current settings of the relays 60 can be adjusted so that when the load current is reduced to a low value the current relays 60 in the protective circuit dropout at a lower proportion of their normal current than the starting relay 66.

While the system shown in Fig. 4 is slightly more expensive to build, it has the advantage that the translating system is protected in case a predetermined number of units are rendered inoperative without the anode or cathode breaker being opened, such as by failure of the excitation system. In such a circumstance the protective system shown in Fig. 4 operates to disconnect all of the units from the supply circuit in response to the inoperation of a predetermined number of the units.

While only a few embodiments of the present invention have been illustrated and described it will be apparent to those skilled in the art that modifications may be made therein without departing from the spirit of the invention or from the scope of the appended claims.

It is claimed and desired to secure by Letters Patent:

1. In an electric current translating system having a supply circuit, a load circuit and a plurality of electric translating units connected in parallel between said circuits for transmitting energy therebetween, a protective system comprising in combination a first circuit interrupting means connected between said supply circuit and said units, a plurality of second circuit interrupting means each connected in series with a different one of said units and said load circuit, each said second circuit interrupting means being operable in response to a condition of its associated unit to interrupt the flow of current through said associated unit to said load circuit, and protective means to operate said first circuit interrupting means in response to the operation of a predetermined number of said second circuit interrupting means to cause said first circuit interrupting means to disconnect all of said plurality of units from said supply circuit.

2. An electric current translating system comprising a supply circuit, a load circuit, a plurality of electric current translating units connected in parallel between said circuits for transmitting energy therebetween, and a protective system comprising circuit interrupting means connected between said supply circuit and said plurality of units, and means responsive to interruption of current flow in any predetermined number of said units more than one to cause said circuit interrupting means to simultaneously disconnect all of said units from said supply circuit.

3. An electric current conversion system comprising a supply circuit, a load circuit, a plurality of conversion units connected in parallel between said circuits for transmitting energy therebetween; each of said units including a circuit breaker connected in series between said each said unit and said load circuit, and means to operate said circuit breaker to disconnect said unit from said load circuit in response to a condition of that unit; and protective means for said conversion system including circuit interrupting means to disconnect all of said units from said supply circuit and means associated with said circuit breaker to cause operation of said circuit interrupting means after any predetermined number of said units more than one are disconnected from said load circuit.

4. An electric current conversion system comprising a supply circuit, a load circuit, a plurality of conversion units connected in parallel between said circuits for transmitting energy therebetween, each of said units including a circuit breaker connected in series between said each said unit and said load circuit, and means to operate said circuit breaker to disconnect said unit from said load circuit in response to a condition of that unit, and protective means for said conversion system including circuit interrupting means connecting said supply circuit to said plurality of units, means to operate said circuit interrupting means including a trip coil, and means to energize said trip coil to operate said interrupting means after a predetermined number of said units are disconnected from said load circuit.

5. An electric current conversion system comprising a supply circuit, a load circuit, a plurality of conversion units connected in parallel between said circuits for transmitting energy therebetween, each of said units including a circuit breaker connected in series between said each said unit and said load circuit, and means to operate said circuit breaker to disconnect said each unit from said load circuit in response to a condition of that unit, and protective means for said system including circuit interrupting means connecting said supply circuit to said plurality of units, means to operate said circuit interrupting means including a trip coil, and means to energize said trip coil including a series circuit comprising a relay, a source of voltage, a plurality of current limiting devices, and a plurality of switch means each connected in parallel with a different said device, and a plurality of switch actuating means each associated with a different unit, each said switch actuating means being operable in response to a condition of its associated unit to short circuit its associated said device in said series circuit, the short circuiting of a predetermned number of said devices in response to conditions of their respective units causing said relay to be energized causing said circuit interrupting means to disconnect all of said units from said supply circuit.

6. An electric current conversion system comprising a supply circuit, a load circuit, a plurality of electric valve conversion units connected in parallel between said circuits for transmitting energy therebetween, circuit interrupting means connected between said supply circuit and said units, each said unit of said plurality including a circuit breaker connected in series with said load circuit and said each unit to interrupt the load current through that unit in response to an overload condition of that unit, and protective means to operate said circuit interrupting means in response to operation of any predetermined number more than one of said circuit breakers to disconnect all of said plurality of units from said supply circuit.

7. An electric current conversion system comprising a supply circuit, a load circuit, a plurality of individual electric current mercury arc conversion units connected in parallel between said circuits for transmitting energy therebetween, each of said units including a circuit breaker operable in response to an arc-back condition of that unit for disconnecting said each unit from said load circuit, and a protective system operable to disconnect all of said units from said supply circuit after a predetermined number of units have been disconnected from said load circuit, said protective system comprising circuit interrupting means connected between said supply circuit and said plurality of units, means to operate said interrupting means including a trip coil, and means to energize said trip coil comprising a series circuit including a relay, a source of voltage and a plurality of current limiting devices, and means operable by said circuit breaker of each of said units to short circuit a different one of said devices out of said series circuit to cause the current supplied to said relay from said battery to increase, said relay operating to actuate said trip coil when a predetermined number of said devices are short circuited causing said circuit interrupting means to disconnect all of said units from said supply circuit.

References Cited in the file of this patent

UNITED STATES PATENTS

| | | |
|---|---|---|
| 1,633,490 | Minton | June 21, 1927 |
| 1,976,569 | Levy | Oct. 9, 1934 |
| 2,011,666 | West et al. | Aug. 20, 1935 |
| 2,315,599 | Cox et al. | Apr. 6, 1943 |
| 2,329,083 | Reagan | Sept. 7, 1943 |
| 2,427,450 | Durand | Sept. 16, 1947 |